US011913715B2

(12) United States Patent
Berthelot et al.

(10) Patent No.: US 11,913,715 B2
(45) Date of Patent: Feb. 27, 2024

(54) NATURAL GAS LIQUEFACTION INSTALLATION ARRANGED AT THE SURFACE OF AN EXPANSE OF WATER, AND ASSOCIATED COOLING METHOD

(71) Applicant: TECHNIP FRANCE, Courbevoie (FR)

(72) Inventors: Pierre Berthelot, Paris (FR); Philip Hagyard, Paris (FR)

(73) Assignee: TECHNIP FRANCE, Courbevoie (FR)

(*) Notice: Subject to any disclaimer, the term of this patent is extended or adjusted under 35 U.S.C. 154(b) by 814 days.

(21) Appl. No.: 16/494,222

(22) PCT Filed: Mar. 15, 2018

(86) PCT No.: PCT/EP2018/056565
§ 371 (c)(1),
(2) Date: Sep. 13, 2019

(87) PCT Pub. No.: WO2018/167223
PCT Pub. Date: Sep. 20, 2018

(65) Prior Publication Data
US 2021/0123672 A1 Apr. 29, 2021

(30) Foreign Application Priority Data
Mar. 16, 2017 (FR) ..................... 17 52150

(51) Int. Cl.
F28D 5/00 (2006.01)
F25J 1/00 (2006.01)
(Continued)

(52) U.S. Cl.
CPC ............ F25J 1/0022 (2013.01); F02C 3/305 (2013.01); F25B 11/00 (2013.01); F25J 1/0052 (2013.01);
(Continued)

(58) Field of Classification Search
CPC .. F25J 1/00; F25J 1/0022; F25J 1/0025; F25J 1/0052; F25J 1/0281; F25J 1/0283;
(Continued)

(56) References Cited

U.S. PATENT DOCUMENTS

2009/0090131 A1\* 4/2009 Kuo ................... F25J 1/0052
62/614
2009/0115080 A1 5/2009 Dorin et al.
(Continued)

FOREIGN PATENT DOCUMENTS

CH 692759 10/2002
CN 101013006 A \* 8/2007
(Continued)

OTHER PUBLICATIONS

International Search Report and Written Opinion Issued in corresponding PCT application No. PCT/EP2018/056565 dated Jul. 25, 2018.
(Continued)

Primary Examiner — Brian M King
(74) Attorney, Agent, or Firm — Locke Lord LLP; Christopher J. Capelli; Gabrielle L. Gelozin

(57) ABSTRACT

The installation (10) comprises: —at least one air-cooled heat exchanger (22), the air-cooled heat exchanger (22) comprising a tube bundle capable of accepting a flow (24) that is to be cooled, and a fan capable of causing a flow of air to circulate across the bundle of tubes; —a water spraying assembly (26). The desalination assembly (20) comprises a salt water pickup (100) in the expanse of water (12), the desalination assembly (20) being coupled downstream to the water-spraying assembly (26). The water spraying assembly (26) comprises at least one spray nozzle opening into the bundle of tubes, the or each spray nozzle being directed towards the tubes of the tube bundle so as to spray (Continued)

liquid demineralised water coming from the desalination assembly (20) into contact with the tubes of the tube bundle.

14 Claims, 6 Drawing Sheets

(51) Int. Cl.
  *F02C 3/30* (2006.01)
  *F25B 11/00* (2006.01)
  *F25J 1/02* (2006.01)
  *F28B 1/06* (2006.01)

(52) U.S. Cl.
  CPC .......... *F25J 1/0283* (2013.01); *F25J 1/0284* (2013.01); *F25J 1/0296* (2013.01); *F28B 1/06* (2013.01); *F28D 5/00* (2013.01); *F05D 2240/90* (2013.01)

(58) Field of Classification Search
  CPC ........ F25J 1/0284; F25J 1/0296; F25J 1/0297; F25J 2270/14; F25J 2270/60; F25J 2270/66; F25B 2339/047; B63B 2035/448; F28F 25/02; F28F 25/04; F28F 25/06
  USPC ......................................................... 165/48.1
  See application file for complete search history.

(56) References Cited

U.S. PATENT DOCUMENTS

| | | | |
|---|---|---|---|
| 2009/0301114 A1* | 12/2009 | Rowley | F28F 25/00 165/110 |
| 2010/0206573 A1* | 8/2010 | Paulus | F25J 1/0022 166/335 |
| 2010/0218537 A1 | 9/2010 | Schulze | |
| 2010/0282439 A1 | 11/2010 | Summerer | |
| 2012/0180502 A1* | 7/2012 | Morris | F17C 11/007 62/47.1 |
| 2016/0238312 A1 | 8/2016 | Kakutani et al. | |

FOREIGN PATENT DOCUMENTS

| | | |
|---|---|---|
| CN | 101253380 A | 8/2008 |
| CN | 101903732 A | 12/2010 |
| CN | 102216153 A | 10/2011 |
| CN | 104302540 A | 1/2015 |
| CN | 104862025 A | 8/2015 |
| CN | 205603544 U | 9/2016 |
| EP | 1698847 | 9/2006 |
| JP | 2002122387 | 4/2002 |
| JP | 2008221140 A | 9/2008 |
| JP | 2017/032146 A | 2/2017 |
| WO | 2009048871 A1 | 4/2009 |
| WO | 2015/140044 | 9/2015 |
| WO | 2015/140044 A1 | 9/2015 |

OTHER PUBLICATIONS

Dierks G: "Luftgekuhlte Ruckkuhl Systeme" Kaelte Und Klimatechnik, Gentner, Stuttgart, De Mar. 1, 2000 (Mar. 1 2000). pp.s 1-8, XP003028167. The brief explanation in English is: the reference cited in the International Search Report accompanying with the IDS.

Chinese Office Action, and English translation thereof, dated Oct. 30, 2020, issued during the prosecution of Chinese Patent Application No. CN 201880028475.8.

Korean Notice of Preliminary Refusal and English translation thereof, issued in Korean Patent Application No. 10-2019-7027043.

* cited by examiner

NATURAL GAS LIQUEFACTION INSTALLATION ARRANGED AT THE SURFACE OF AN EXPANSE OF WATER, AND ASSOCIATED COOLING METHOD

CROSS REFERENCE TO RELATED APPLICATIONS

This application is a 371 U.S. National stage application of International PCT Patent Application No. PCT/EP2018/056565, filed on Mar. 15, 2018, which claims priority to French Application No. FR 17 52150 filed on Mar. 16, 2017. The entire contents of these applications are incorporated herein by reference in their entirety.

The present invention relates to a natural gas liquefaction installation, arranged at the surface of a body of water, including:
- at least one air-cooled heat exchanger, the air-cooled heat exchanger including a tube bundle capable of receiving a flow that is to be cooled, and a fan capable of causing a flow of air to circulate across the bundle of tubes;
- a water spraying assembly.

Such an installation is in particular intended to liquefy natural gas produced from a reservoir located below a body of water, or on land, and which is conveyed up to the installation.

The installation is advantageously an installation floating on the body of water, such as a platform or a barge bearing a natural gas liquefaction unit, referred to using the term "Floating Liquefied Natural Gas" or "FLNG" unit.

Such an installation is in particular intended to produce natural gas, liquefy the produced natural gas, then store and/or transfer the liquefied natural gas onto a methane tanker or other transport barge. This simplifies the transport of the gas toward the consumption sites, while reducing the transported volume. Furthermore, arranging the installations at sea reduces the risks related to such an installation in inhabited zones and decreases the environmental impact.

In order to implement a natural gas liquefaction method cost-effectively, the liquefaction units discharge a large quantity of heat into the surrounding environment, in practice into the air or water.

Many natural gas liquefaction units have been built on land since the 1960s. The cooling techniques used on land are not fully satisfactory when they are transposed at sea.

The advantage of a floating natural gas liquefaction installation is that by nature, it has a cooling water source that is plentiful and at a low temperature. As a result, it is known to circulate water taken from the body of water in order to cool equipment from the liquefaction unit, either directly or by means of a freshwater loop. This requires having a cumbersome and heavy cooling water circuit on the installation, as well as a substantial sea water pickup.

To overcome these problems, it is possible to use air cooling exchangers. Such exchangers do not require bringing water into the installation. They are, however, very cumbersome to offer a sufficient exchange surface.

A cooling network by water circulation on exchangers or an air cooler are not fully satisfactory, due to the fact that the available space on a floating installation is reduced relative to a similar liquefaction unit on land. The liquefaction capability of the installation is therefore limited to accommodate all of the equipment on the floating installation. Furthermore, the heated water produced in large quantity by the installation must be discharged in the body of water, which can create an environmental impact.

It is known that cooling by water evaporation is effective and compact. On land, it is cost-effective to provide a retention basin on the cooling towers and to perform partial evaporation of water charged with salts and other dry residues.

In order to reduce the bulk, WO2015/140044 describes a floating liquefied natural gas production unit, provided with air heat exchangers that are all supplied by a centralized air intake pipe arranged on board the hull. This ensures that the air supplied to each of the heat exchangers is fresh air, and not air having already circulated in a heat exchanger.

In one particular embodiment, water droplets are sprayed at the inlet of the supply pipe to cool and moisten the incoming air. The water droplets evaporate in the pipe and the air flow supplying the heat exchangers is devoid of liquid droplets.

Such an installation therefore improves the cooling capacity, but remains very bulky, which affects the liquefied natural gas production capacity.

One aim of the invention is to further increase the production capacity of a floating liquefied natural gas installation, while limiting the bulk of the installation.

To that end, the invention relates to an installation of the aforementioned type, characterized by:
- a desalination assembly including a salt water pickup in the body of water, the desalination assembly being coupled downstream to the water-spraying assembly,
- the water-spraying assembly including at least one spray nozzle emerging in the tube bundle, the or each spray nozzle being directed towards the tubes of the tube bundle so as to spray liquid demineralized water coming from the desalination assembly into contact with the tubes of the tube bundle.

According to specific embodiments, the installation according to the invention comprises one or several of the following features, considered alone or according to any technically possible combinations:
- the tube bundle has several levels of tubes, the water-spraying assembly including at least a first spray nozzle emerging across from the tubes of a first level of tubes and at least one second spray nozzle emerging across from the tubes of a second level of tubes;
- the air-cooled heat exchanger includes an enclosure defining an inner circulation pipe for a gas flow, the bundle of tubes being received in the inner pipe, at least one spray nozzle emerging in the inner pipe defined by the enclosure;
- the fan is capable of circulating air from bottom to top, from top to bottom, or transversely through the bundle(s) of tubes;
- the water-spraying assembly includes a control unit for controlling the flow rate of water sprayed by the or each spray nozzle, the control unit being able to adjust the water flow rate in order to prevent the circulation of liquid demineralized water from the water-spraying assembly downstream from the tube bundle;
- the or each air-cooled heat exchanger is arranged in a cooling cycle including a coolant circulating through the tube bundle, a compressor capable of compressing the coolant upstream from the tube bundle, an expansion member of the coolant arranged downstream from the tube bundle and a main heat exchanger, capable of placing the coolant in a heat exchange relationship with a process fluid to be cooled;
- the cooling cycle includes an intermediate heat exchanger, inserted between the air-cooled heat exchanger and the expansion member, the intermediate heat exchanger being supplied by a coolant capable of entering into a heat exchange relationship with a flow of salt water coming from the salt water pickup, by a flow of salt water coming from the salt water pickup and/or by a flow of salt water coming from a salt water pump not passing through the salt water pickup;

it includes at least one gas turbine, and at least one secondary water-spraying assembly connected to the desalination assembly, the secondary water-spraying assembly including at least one secondary demineralized water-spraying nozzle coming from the desalination assembly in the gas turbine;

it includes a hull and at least one deck located above the hull, the air-cooled heat exchanger being located on the deck, the desalination assembly being arranged in the hull;

the desalination assembly includes a pure water production system, for example by reverse osmosis, a filtration system, and/or polishing.

The invention also relates to a method for cooling a flow, including the following steps:

circulation of a flow to be cooled in a bundle of tubes of an air-cooled heat exchanger of an installation as defined above;

supply of the water-spraying assembly with demineralized water produced in the desalination assembly;

spraying of demineralized water by at least one spray nozzle emerging opposite the tubes of the tube bundle, the spray nozzle being directed towards the tubes of the tube bundle in order to spray liquid demineralized water coming from the desalination assembly in contact with the tubes of the tube bundle, total evaporation of the sprayed demineralized water.

According to specific embodiments, the method according to the invention comprises one or more of the following features, considered alone or according to any technically possible combination:

the tube bundle has at least a first level of tubes and a second level of tubes, the method including the spraying of demineralized water coming from the desalination assembly through at least a first spray nozzle emerging at the first level and simultaneously through at least a second spray nozzle emerging at the second level.

it comprises controlling the flow rate of water sprayed through the or each spray nozzle to prevent circulation of liquid demineralized water coming from the water-spraying assembly downstream from the tube bundle;

it comprises pumping salt water through the salt water pickup, bringing the salt water into the desalination assembly, producing demineralized water from the desalination assembly, in order to supply the water-spraying assembly.

The invention will be better understood upon reading the following description, provided solely as an example, and done in reference to the appended drawings, in which.

Hereinafter, the terms "upstream" and "downstream" are to be understood relative to the normal circulation direction of the flow in a pipe.

Figure 1:
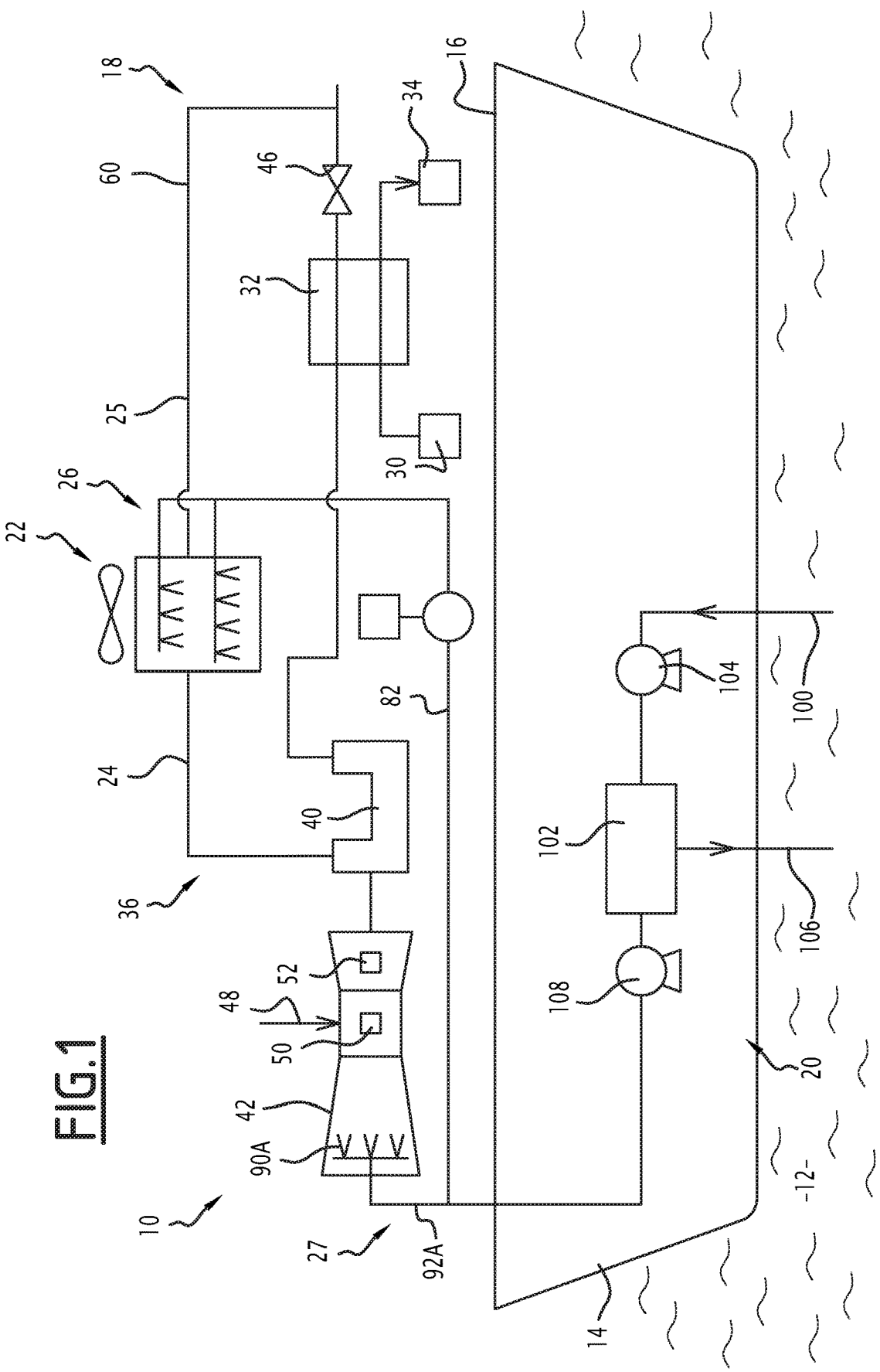
FIG. 1 is a schematic view of a first floating natural gas liquefaction installation according to the invention.

A first natural gas liquefaction installation 10 according to the invention is illustrated schematically by FIG. 1. The installation 10 is intended to be arranged on the surface of a body of water 12.

The body of water 12 is for example a sea, a lake or an ocean. The depth of the body of water 12 at the installation 10 is for example between 15 m and 3000 m.

The installation 10 is able to collect natural gas coming from an underground reservoir (not shown). The natural gas is produced directly on the installation 10. In a variant, the natural gas is produced on another production unit on the surface of the body of water 12 or on a land-based production unit and is conveyed to the installation 10 by a transport line.

The installation 10 is advantageously a floating installation. In a variant, the installation 10 is fastened on the bottom of the body of water by a submerged structure.

In the example shown in FIG. 1, the installation 10 is a floating liquefied natural gas (FLNG) unit.

The installation 10 includes a hull 14 floating on the surface of the body of water 12, and at least one deck 16 supported by the hull 14. The deck 16 is arranged above the surface of the body of water 12.

The installation 10 includes a natural gas liquefaction unit 18, the relevant parts of which are shown in FIG. 1, and a water desalination assembly 20 suitable for producing demineralized water from salt water taken from the body of water 12.

The natural gas liquefaction unit 18 is advantageously arranged on the deck 16 and the desalination assembly 20 is preferably housed in the hull 14.

The natural gas liquefaction unit 18 includes at least one air-cooled heat exchanger 22 intended to cool a flow 24 circulating in the unit 18 to produce a cooled flow 25. According to the invention, it includes a spraying assembly 26, in the air-cooled heat exchanger 22, for spraying demineralized water coming from the desalination assembly 20.

The liquefaction unit 18 further advantageously includes a secondary assembly 27 for spraying demineralized water into at least one other piece of equipment of the liquefaction unit 18, for example a gas turbine.

In this example, the liquefaction unit 18 includes a source of natural gas 30 to be cooled, a main heat exchanger 32 for cooling the natural gas coming from the source 30, and a system 34 for liquefying cooled natural gas coming from the main heat exchanger 32.

The liquefaction unit 18 further includes at least one cooling cycle 36 of the main heat exchanger 32, the cooling cycle 36 incorporating the air-cooled heat exchanger 22.

The natural gas source 30 is connected to the natural gas-producing installation, advantageously by means of natural gas purification units intended to extract water, heavy compounds (for example C6+ compounds) and sulfurous compounds.

The main heat exchanger 32 is capable of creating a contactless heat exchange relationship between the natural gas to be cooled coming from the source 30 and the coolant circulating in the cooling cycle 36, in order to decrease the temperature of the natural gas.

The liquefaction system of the natural gas 34 advantageously includes at least one expansion member (not shown) of the cooled natural gas. It includes at least one collection reservoir of the liquefied natural gas.

The LNG collection and storage reservoir is capable of being connected to a methane tanker or other transport barge to discharge the liquefied natural gas produced in the liquefaction unit 18.

The cooling cycle 36 includes, in the circulation direction of the coolant from the outlet of the main heat exchanger 32, a compressor 40 most often coupled to a gas turbine 42, and the air-cooled heat exchanger 22. The cooling cycle 36 further comprises an expansion member 46 for the coolant.

Figure 6:
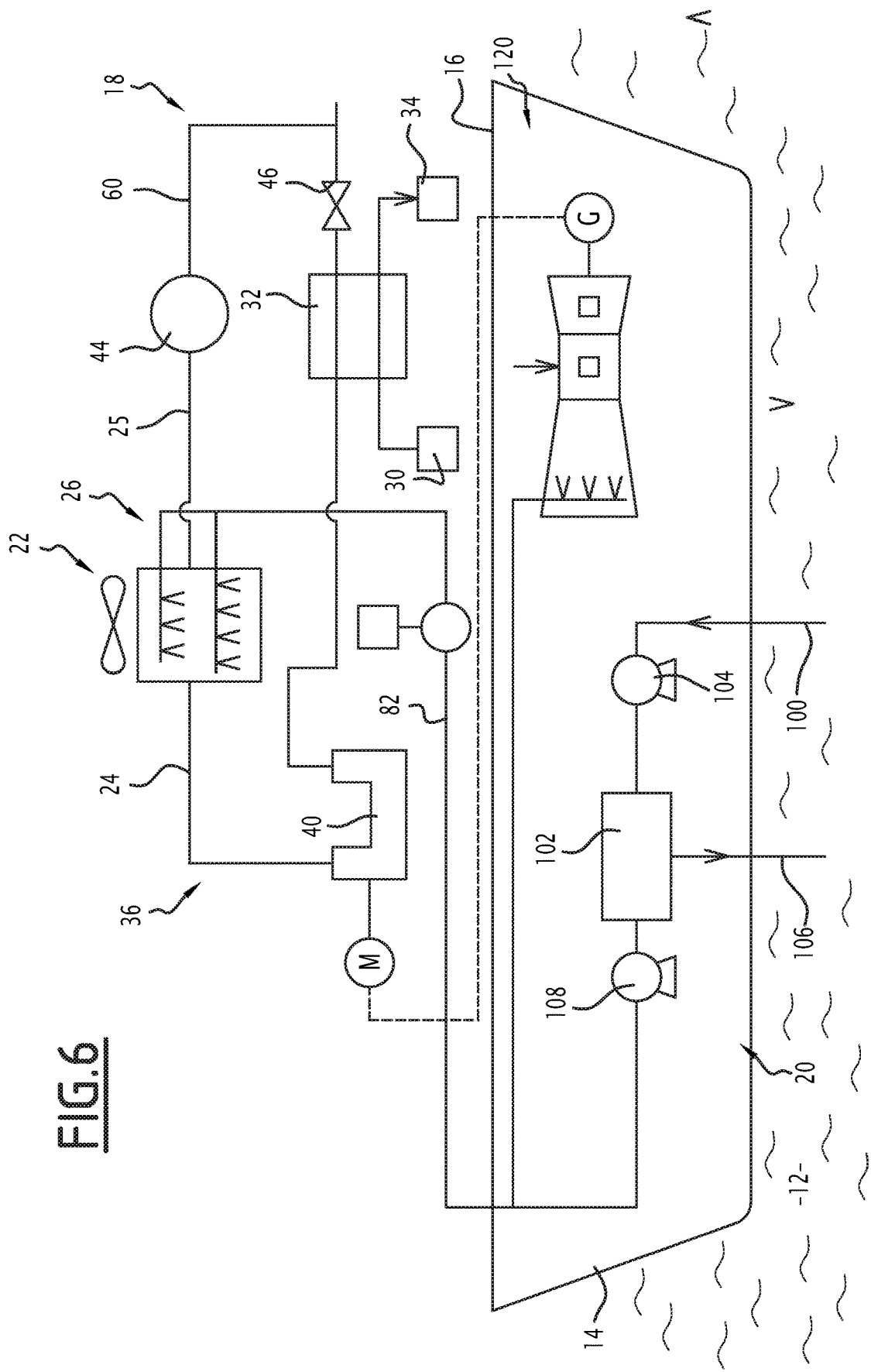

The compressor 40 can also be driven by an electric motor as shown in a variant in FIG. 6. In this case, the electricity-producing gas turbines, which can be installed in the hull, can also benefit from an injection of water improving their performance.

The compressor 40 is able to recover the heated coolant coming from the main heat exchanger 32 and recompress it. In this example, it is driven by the gas turbine 42.

The gas turbine 42 includes a fuel injection 48, a combustion chamber 50 receiving the fuel, an air compressor in the upstream part of the gas turbine 42 and a downstream turbine 52.

The expansion member 46 here is a static expansion valve. In a variant, the expansion member 46 is a dynamic expansion turbine. The expansion member 46 is capable of expanding and liquefying the cooled flow 60 coming from the intermediate heat exchanger 44 before it is introduced into the main heat exchanger 32.

Figure 2:
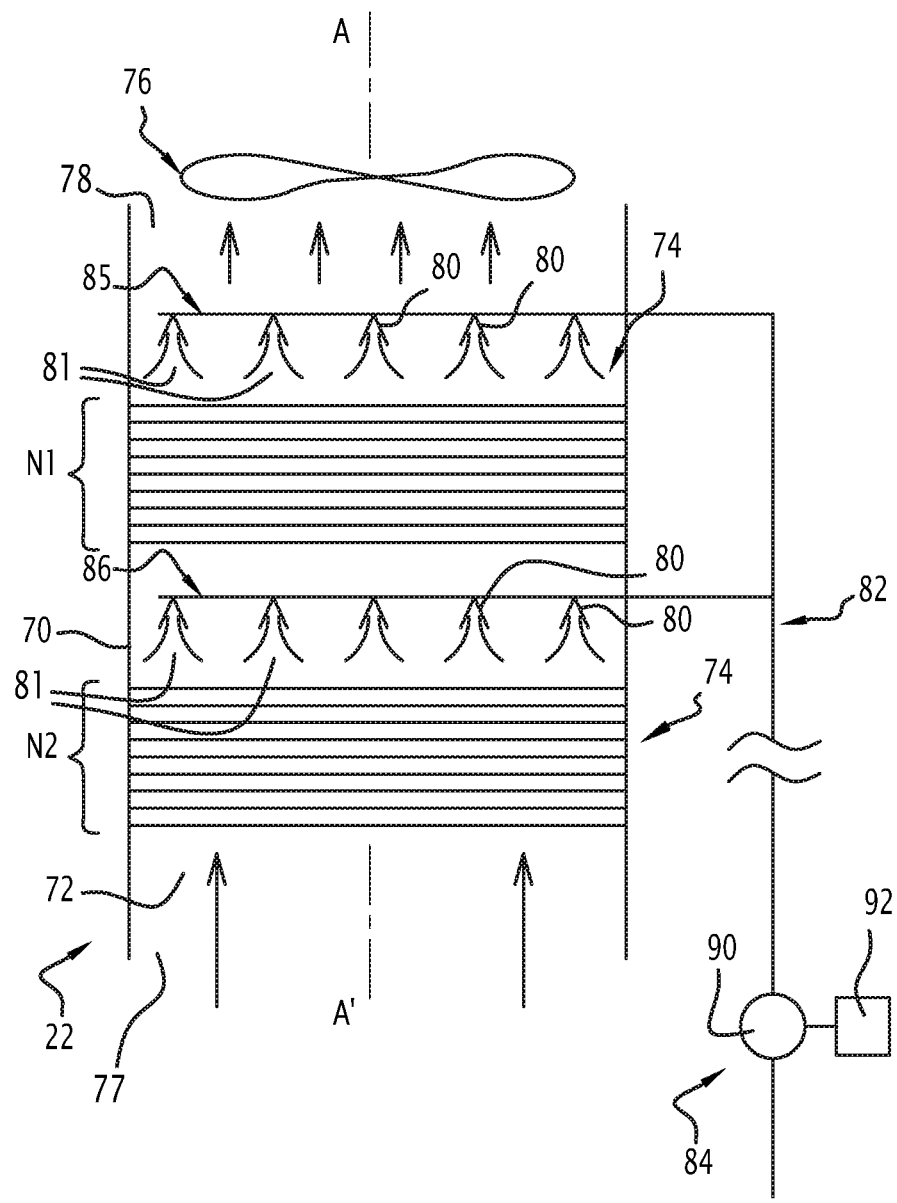
FIG. 2 is a schematic view of a detail of an air-cooled heat exchanger of the installation of FIG. 1.

In reference to FIG. 2, the air-cooled heat exchanger 22 includes an enclosure 70 defining an inner circulation pipe 72 for a gas flow along the local axis A-A', extending between an air inlet 77 and an air outlet 78.

The air flow penetrating the enclosure through the air inlet 77 is under atmospheric conditions. After passage in the heat exchanger, the air flow extracted through the air outlet 78 has a higher temperature than at the air inlet 77. It is charged with steam and devoid of free water.

The air-cooled heat exchanger 22 further includes a tube bundle 74 passing through the inner pipe 72 in order to circulate the flow to be cooled 24 through the inner pipe 72 and at least one fan 76, capable of producing the driving of the gas flow through the inner pipe 72 around the tubes of the tube bundle 74.

The tube bundle 74 comprises a plurality of tubes intended to convey the flow to be cooled 24 through the inner pipe 72. The tubes are capable of placing the flow to be cooled 24 in a contactless heat exchange relationship with the gas flow circulating in the inner pipe.

In this example, the tubes of the tube bundle 74 extend transversely relative to the circulation axis A-A'. They are arranged parallel to one another at several levels N1 to N2 along the circulation axis A-A'.

In the example shown in FIG. 2, the circulation axis A-A' extends vertically. The tubes of the tube bundle 74 extend horizontally on several levels N1 to N2 located above one another along the vertical axis.

The tubes of the tube bundle 74 exclusively contain the flow 24 to be cooled. The tubes can be smooth on their outer and/or inner surfaces, or be equipped with improved surfaces in the form of structures or fins that are worked in the metal mass or attached.

The propeller of the fan 76 is arranged transversely relative to the circulation axis A-A'. In this example, the propeller of the fan 76 is positioned downstream from the tube bundle 74, relative to the circulation direction of the gas at the outlet of the pipe 72 defined by the enclosure 70. In a variant, the propeller of the fan 76 is arranged upstream from the tube bundle 74 relative to the gas circulation direction.

When it is rotated, the propeller of the fan 76 drives the air flow circulating in the pipe 72, from upstream to downstream around the tubes of the tube bundle 74.

The propeller of the fan 76 here is arranged above the tubes of the tube bundle 74. It is capable of creating a flow of air circulating from bottom to top in the pipe 72.

The spraying assembly 26 includes a plurality of demineralized water spray nozzles 80 coming from the desalination assembly 20, directed towards the tubes of the tube bundle 74, in order to spray liquid demineralized water in contact with the tubes of the tube bundle 74.

The water here is sprayed in the form of jets coming from the nozzles 80. The jets coming from the nozzles 80 are sprayed directly onto the tubes of the tube bundle 74.

The spraying assembly 26 further comprises an intake pipe for bringing demineralized water towards the nozzles 80 and a control unit 84 for the water flow rate sprayed by the or each spray nozzle 80 onto the tubes of the tube bundle 74.

In the non-limiting example shown in FIG. 2, the spraying assembly 26 includes at least a first nozzle bar 85 located across from a first level of tubes of the tube bundle 74, and at least a second nozzle 80 bar 86 located across from a second level of tubes of the tube bundle 74 axially offset along the circulation axis A-A' relative to the first level.

Thus, the water distribution by the nozzles 80 is staged along the circulation axis A-A'.

In the example shown in FIG. 2, all of the nozzles 80 are arranged inside the inner pipe 72 defined by the tubular enclosure 70. Each nozzle 80 is placed directly opposite a tube of the tube bundle 74 in order to spray water directly on the tubes.

At least some of the nozzles 80 emerge between two tubes of the tube bundle 74.

The nozzles 80 here are directed downwards to create water jets falling onto the tubes of the tube bundle 74 by gravity.

The intake pipe 82 is connected downstream to the desalination assembly 20, in order to be supplied with demineralized water.

The control unit 84 comprises at least one flow rate adjusting valve 90 in the pipe 82 and a control unit 92, capable of adjusting the water flow rate supplied to the nozzles 80 by means of the flow rate adjusting valve 90 so that the water coming from the nozzles 80 that comes into contact in liquid form with the tubes of the tube bundle 74, is completely evaporated, thus preventing excessive liquid demineralized water from the water-spraying assembly 26 downstream from the tube bundle 74.

The water jets sprayed by the nozzles 80 are directed exclusively towards the surface of the tubes of the tube bundle 74. They are capable of reaching the surface of the tubes of the tube bundle 74 in liquid form, and evaporate there completely.

Thus, to avoid a collection basin and to benefit from an optimal use of the water, no water is driven downstream past the tube bundle 74. In a variant, a small proportion of the water sprayed by the nozzles 80 in free water is driven. In any case, no accumulation of liquid resulting from the spraying of water by the nozzles 80 occurs downstream from the tube bundle 74.

In reference to FIG. 1, the secondary spraying assembly 27 includes at least one secondary spray nozzle 90A emerging in the gas turbine 42 and a demineralized water intake pipe 92A in the secondary nozzle 90A.

This intermediate water injection makes it possible to improve the performance of the gas turbine.

The gas turbine 42 that drives the refrigeration compressor 40 benefits from a power increased by the water injection.

The desalination assembly 20 includes a salt water pickup 100, a desalination unit 102, and an upstream salt water pickup pump 104, arranged between the salt water pickup 100 and the desalination unit 102.

The desalination assembly 20 further includes a brine discharge outlet 106 to the body of water 12 and a demineralized water discharge pump 108 towards the water spraying assemblies 26, 27.

The water pickup 100 emerges downwards into the body of water 12. It is for example connected to a riser, as described in one of French applications FR 3,036,412 or FR 3,037,343 by the Applicant.

The desalination unit 102 for example includes a multi-staged reverse osmosis system, a filtration system and polishing.

It is capable of producing, from sea water having a salinity generally greater than 20 g/l, demineralized water having a practically nil salinity (conductivity <0.2 µS) and a brine having a salinity greater than that of the source. The brine is capable of being discharged through the discharge outlet 106. The demineralized water is capable of being distributed to the projection assemblies 26, 27 by means of the pump 108.

The pump 108 is connected downstream to the respective intake pipes 82, 92A.

The operation of the natural gas liquefaction installation 10 according to the invention will now be described, in reference to FIGS. 1 and 2.

Initially, pressurized natural gas is produced from an underground reservoir, and is conducted to the source 30 on the installation 10. The natural gas is conveyed through the main heat exchanger 32 to enter a heat exchange relationship with a coolant circulating in the cooling cycle 36.

The natural gas is thus cooled, for example to a temperature between −100° C. and −164° C. as a function of the quality of the gas and the liquefaction method. In the liquefaction system 34, the natural gas may undergo a flash expansion to be liquefied. The liquefied natural gas is recovered in a reservoir before being discharged by means of a methane tanker or barge.

The reheated coolant coming from the main heat exchanger 32 is brought to the compressor 40 to be compressed therein. Then, it is conveyed in the form of a flow to be cooled 24 to the air-cooled heat exchanger 22 in order to circulate in the tubes of the tube bundle 74.

At the same time, the pump 104 of the desalination assembly 20 is activated in order to pump salt water through the water pickup 100 and bring it to the desalination unit 102. In the desalination unit 102, the salt water is desalinated to produce demineralized water and brine. Demineralized water is pumped by the pump 108 to the intake pipes 82, 92A.

Then, the spraying assembly 26 is activated. Demineralized water from the desalination assembly 20 is conveyed to each nozzle 80 in order to create water jets that are sprayed directly onto the tubes of the tube bundle 74.

The water sprayed on the tubes evaporates in contact with the outer surface of the tubes, creating a cooling thermal power of the flow to be cooled 24 that circulates through the tubes of the tube bundle 74.

This is particularly effective when the nozzles 80 are distributed at different levels of the tube bundle 74, for example on the first bar 85 and on the second bar 86.

The fan 76 is also activated to create a circulation of an air flow in the pipe 72 along the circulation axis A-A, making it possible to discharge the extracted heat.

The residual water that has not evaporated on a tube of the tube bundle 74 gradually evaporates in the pipe 72, in the air that gradually heats up.

The control unit 84 controls the water flow rate circulating through the intake pipe 82 so that at the outlet of the tube bundle 74, all of the water sprayed by the nozzles 80 has evaporated.

The optimal water flow rate supplied to the nozzles 80 is determined automatically so as to satisfy temperature set-point values of the fluid to be cooled or cold to be provided in the case of partial condensation. The operating state of the fan(s) 76 can be associated with this water flow rate optimization. The optimal water flow rate can further be predicted by calculation at each moment by the control unit 84 as a function of physical parameters of the exchanger, the temperature and/or humidity of the ambient air, of the air flow rate created by the fan 76 and heat to be discharged on the process side. The number of nozzles in use can be optimized as a function of the charge.

This optimizes the effectiveness of the cooling by evaporation, while preventing the recovery of free water downstream from the tube bundle 74.

This calculation of the optimization of the flow rate is based on the algorithms for tackling heat exchanges that were used to define the equipment.

Thus, the flow to be cooled 24 is cooled particularly effectively, with an air-cooled heat exchanger 22 that does not need a cumbersome water intake piping into the installation 10.

A majority, or even all of the demineralized water production installations can be located in zones separate from the hydrocarbon production zones, for example the hull of the FLNG. The compactness of the air-cooled heat exchanger 22 is therefore optimal, which increases the available space for the natural gas production or liquefaction equipment. The overall capacity of the installation 10 is therefore increased.

In the example shown in FIG. 2, the enclosure 70 defines a vertical pipe 72 emerging toward the bottom, upstream from the tube bundle 74.

In a variant, design parameters are optimized based on the needs, namely direction of the air flow, number of bundles and nozzles, the principle of direct liquid water contact with the tubes and its total evaporation on the surface being respected in all cases.

In a variant, the air flow is driven from top to bottom in the pipe 72.

When the temperature that it is possible to obtain with this method by direct operation is substantially higher than the temperature that it is possible to obtain with the coolant water (direct sea water or cooled fresh water to sea water), the cooled flow 25 coming from the exchanger 22 is conveyed to an intermediate heat exchanger 44 integrated into the cycle to undergo additional cooling, before being expanded in the expansion member 46, to be reintroduced into the main heat exchanger 32. This is shown in FIG. 3.

The cooling method in this case once again becomes equivalent in terms of energy or production to what it would be with conventional water cooling, but with the advantage of having considerably reduced the conventional cooling water needs.

Figure 3:
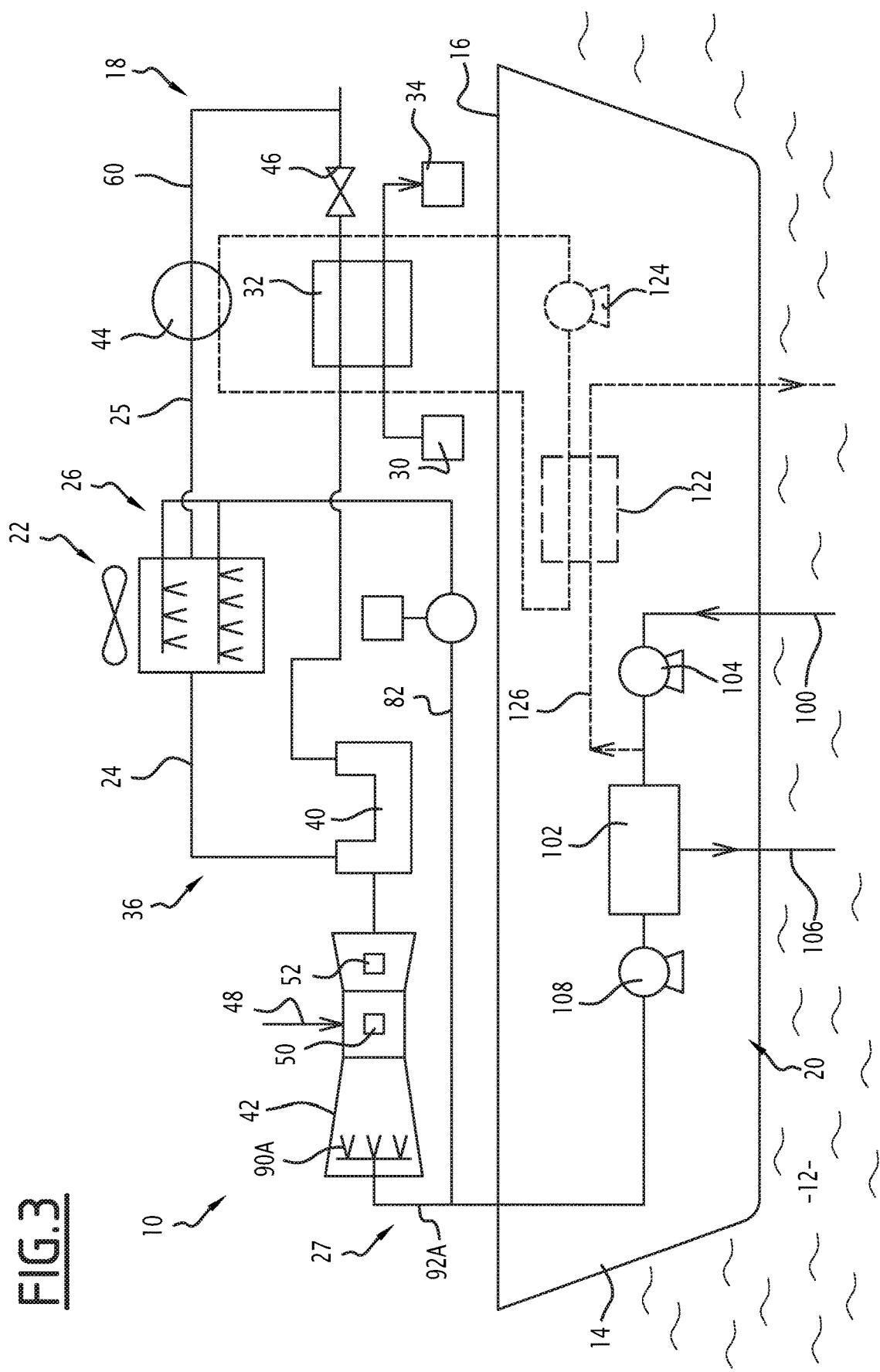
FIGS. 3 to 6 are views similar to FIG. 1 illustrating installation variants according to the invention.

The heat exchanger 44 is cooled by sea water from the body of water 12 as shown in FIG. 3.

In the variant of FIG. 3 with additional cooling, the liquefaction unit 18 includes an additional cooling cycle 120 incorporating the intermediate heat exchanger 42 in which the coolant warms up.

The additional cooling cycle 120, shown in FIG. 3, further includes a primary heat exchanger 122 intended to cool the coolant after it passes in the intermediate heat exchanger 42 and an additional pump 124 capable of pumping the coolant coming from the additional heat exchanger 44 into the primary heat exchanger 122.

The primary heat exchanger 122 is also supplied by a salt water circulation pipe 126 coming from the salt water pickup 100.

The circulation pipe 126 is tapped downstream from the pump 104 and upstream from the desalination unit 102. It passes through the heat exchanger 122 in order to place the sea water recovered by the salt water pickup 100 in a contactless heat exchange relationship with the coolant coming from the pump 124.

The circulation pipe 126 emerges downstream in the body of water 12.

During operation, salt water coming from the body of water 12 is withdrawn through the salt water pickup 100 and is partially deviated by means of the pump 104 towards the circulation pipe 126. The salt water warms up while cooling the coolant circulating in the primary heat exchanger 122, before it passes in the intermediate heat exchanger 44.

Figure 4:
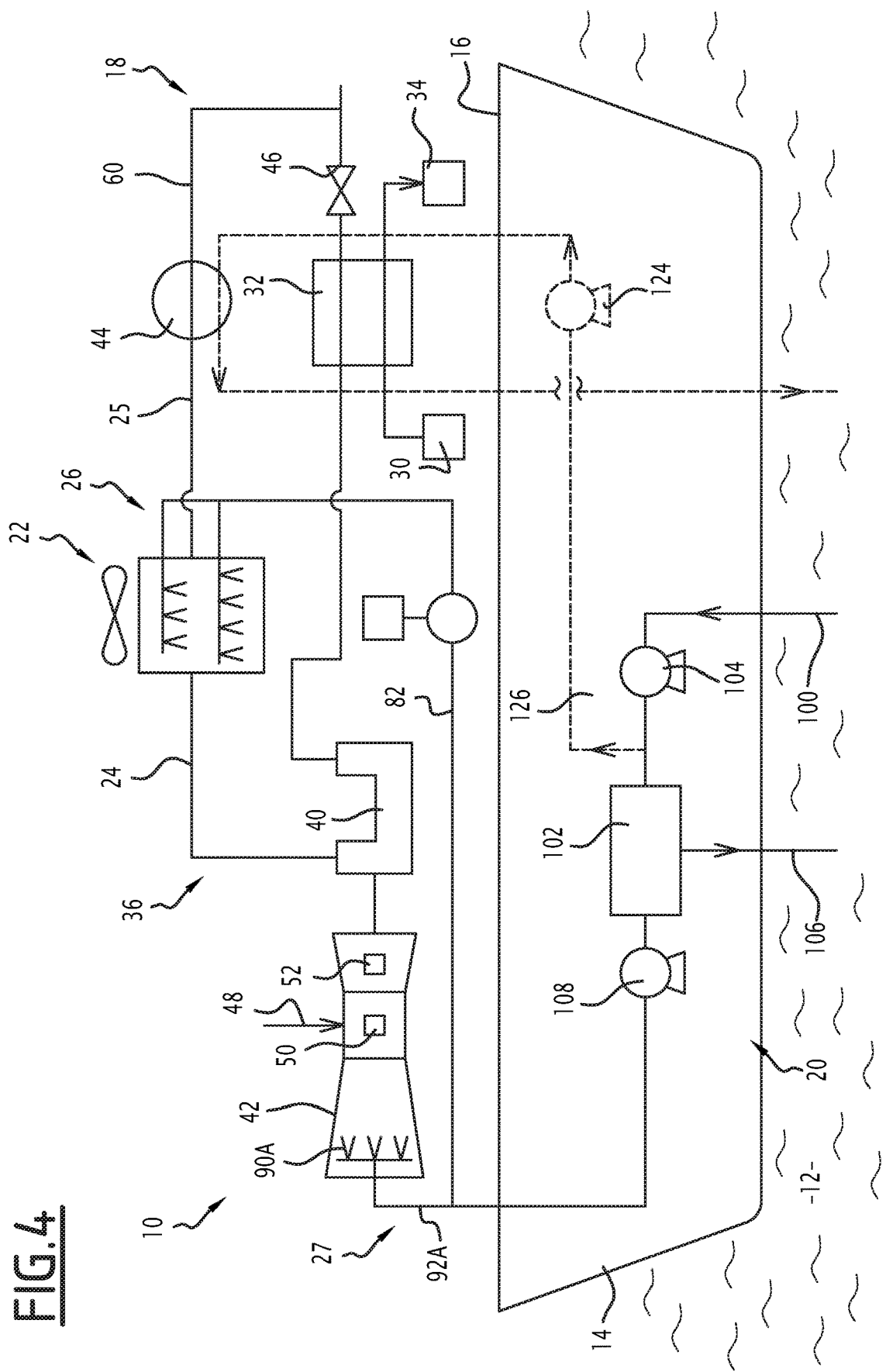
Figure 5:
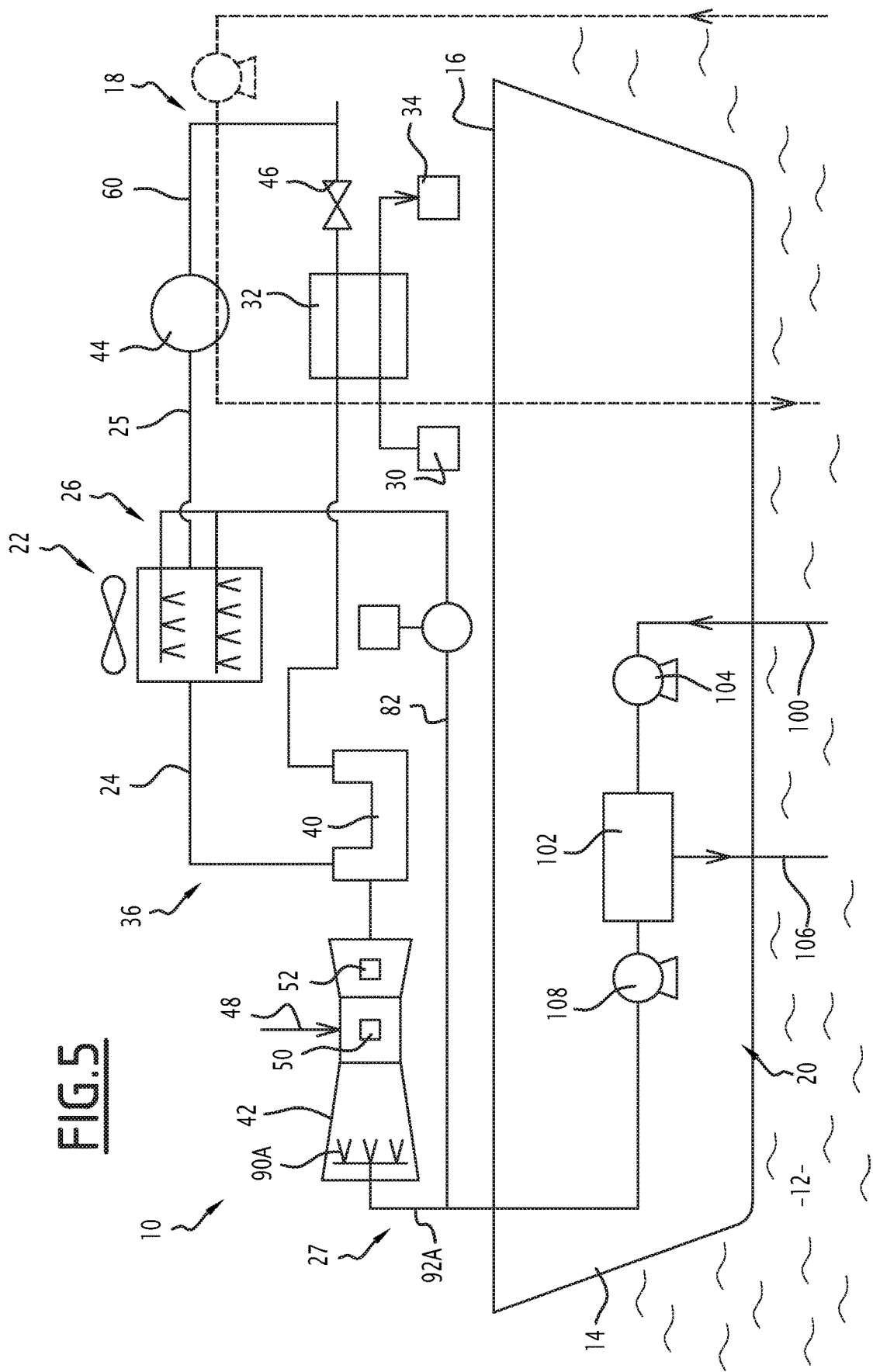

In the variant of FIG. 3, the heat exchanger 44 is cooled directly by the sea water as shown in FIGS. 4 and 5.

In the example of FIG. 4, the sea water providing the cooling of the exchanger 44 is pumped from the sea intake pipe to the desalination system 102, by the pump 124. This sea water circulation pipe emerges downstream in the body of water 12.

In the example of FIG. 5, the sea water ensuring the cooling of the exchanger 44 is pumped from an external pumping station independent of the hull, mounted cantilevered on the module including the exchanger 44.

The invention claimed is:

1. A natural gas liquefaction installation, arranged at the surface of a body of water, comprising:
    at least one air-cooled heat exchanger, the at least one air-cooled heat exchanger including a tube bundle configured to receive a flow that is to be cooled, and a fan configured to cause a flow of air to circulate across the tube bundle;
    a water-sprayer;
    a desalinizer including a salt water pickup in the body of water, the desalinizer being coupled upstream to the water-sprayer,
    the water-sprayer including at least one spray nozzle opening onto the tube bundle, the at least one spray nozzle being directed towards tubes of the tube bundle so as to spray liquid demineralized water coming from the desalinizer into contact with the tubes of the tube bundle,
    wherein the at least one air-cooled heat exchanger is arranged in a cooling cycle including a coolant circulating through the tube bundle, a compressor configured to compress the coolant upstream from the tube bundle, a coolant expander arranged downstream from the tube bundle and a main heat exchanger configured to place the coolant in a heat exchange relationship with a process fluid to be cooled,
    wherein the cooling cycle includes an intermediate heat exchanger, inserted between the air-cooled heat exchanger and the expander, the intermediate heat exchanger being supplied by a coolant capable of entering into a heat exchange relationship with a flow of salt water coming from the salt water pickup, by a flow of salt water coming from the salt water pickup and/or by a flow of salt water coming from a salt water pump not passing through the salt water pickup.

2. The installation according to claim 1, wherein the tube bundle has several levels of tubes, the water-sprayer including at least a first spray nozzle opening across from tubes of a first level of tubes and at least a second spray nozzle opening across from tubes of a second level of tubes.

3. The installation according to claim 2, wherein the air-cooled heat exchanger includes an enclosure defining an inner circulation pipe for a gas flow, the tube bundle being received in the inner pipe, at least one of the at least first spray nozzle and/or the at least second spray nozzle opening in the inner pipe defined by the enclosure.

4. The installation according to claim 1, wherein the fan is configured to circulate air from bottom to top, from top to bottom, or transversely through the tube bundle.

5. The installation according to claim 1, wherein the water-sprayer includes a controller configured to control a water flow rate of water sprayed by the at least one spray nozzle, the controller being configured to adjust the water flow rate in order to prevent the circulation of liquid demineralized water from the water-sprayer downstream from the tube bundle.

6. The installation according to claim 1, including at least one gas turbine, and at least one secondary water-sprayer connected to the desalinizer, the at least one secondary water-sprayer including at least one secondary demineralized water-spraying nozzle to spray demineralized water coming from the desalinizer in the gas turbine.

7. The installation according to claim 1, including a hull and at least one deck located above the hull, the air-cooled heat exchanger being located on the at least one deck, the desalinizer being arranged in the hull.

8. The installation according to claim 1, wherein each spray nozzle of the at least one spray nozzle is configured to create at least one water jet that is sprayed directly on tubes of the tube bundle.

9. A method for cooling a flow, comprising:
    circulating the flow to be cooled in the tube bundle of the air-cooled heat exchanger of the installation according to claim 1;
    supplying the water-sprayer with demineralized water produced in the desalinizer;
    spraying of demineralized water by at least one spray nozzle opening opposite tubes of the tube bundle, the at least one spray nozzle being directed towards the tubes of the tube bundle in order to spray liquid demineralized water coming from the desalinizer in contact with the tubes of the tube bundle, such that a total amount of demineralized water sprayed onto the tube bundle is evaporated.

10. The method according to claim 9, wherein the tube bundle has at least a first level of tubes and a second level of tubes, the method including spraying demineralized water coming from the desalinizer through at least a first spray nozzle opening at the first level and simultaneously through at least a second spray nozzle opening at the second level.

11. The method according to claim 9, comprising controlling a flow rate of water sprayed through each spray nozzle to prevent circulation of liquid demineralized water coming from the water-sprayer downstream from the tube bundle.

12. The method according to claim 9, comprising pumping salt water through the salt water pickup, and producing demineralized water from the desalinizer, to supply the water-sprayer.

13. The method according to claim 9, comprising conveying the demineralized water coming from the desalinizer to the at least one nozzle to create water jets and spraying the water jets directly onto the tubes of the tube bundle, evaporating water of the water jets sprayed on the tubes of the tube bundle in contact with the tubes of the tube bundle, to create a thermal power for cooling the flow to be cooled that circulates through the tubes of the tube bundle.

14. A natural gas liquefaction installation, arranged at the surface of a body of water, comprising:
  at least one air-cooled heat exchanger, the at least one air-cooled heat exchanger including a tube bundle configured to receive a flow that is to be cooled, and a fan configured to cause a flow of air to circulate across the tube bundle;
  a water-sprayer;
  a desalinizer including a salt water pickup in the body of water, the desalinizer being coupled upstream to the water-sprayer,
  the water-sprayer including at least one spray nozzle opening onto the tube bundle, the at least one spray nozzle being directed towards tubes of the tube bundle so as to spray liquid demineralized water coming from the desalinizer into contact with the tubes of the tube bundle,
  including at least one gas turbine, and at least one secondary water-sprayer connected to the desalinizer, the at least one secondary water-sprayer including at least one secondary demineralized water-spraying nozzle to spray demineralized water coming from the desalinizer in the gas turbine.

\* \* \* \* \*